Patented Feb. 10, 1953

2,628,257

UNITED STATES PATENT OFFICE 2,628,257

PRODUCTION OF UNSATURATED ALDEHYDES

Raymond I. Hoaglin and Donald H. Hirsh, South Charleston, W. Va., assignors to Union Carbide and Carbon Corporation, a corporation of New York No Drawing. Application November 9, 1950, Serial No. 194,935

8 Claims. (Cl. 260—601)

This invention relates to a method for making unsaturated aldehydes.

Unsaturated aldehydes are commonly made at present by the aldolization of saturated aldehydes followed by dehydration of the aldol. A limitation of this method is that branched-chain aldehydes result when aldehydes containing more than two carbon atoms are reacted. For instance, butyraldehyde reacts with acetaldehyde to form 2-ethylcrotonaldehyde from which 2-ethylbutanol can be obtained by hydrogenation. Thus the present method of alcohol synthesis based on the aldolization of aldehydes is not adapted for the production of straight chain alkanols higher than butanol. However, for certain applications, the higher straight chain alcohols are required in preference to the branched chain alcohols of the same number of carbon atoms.

Thus one of the objects of the invention is to provide a method whereby higher straight chain unsaturated aldehydes may be obtained from saturated aldehydes.

We have found that alkenyl alkyl ethers, in particular vinyl alkyl ethers, will react with saturated aldehydes preferably in the presence of a Friedel-Crafts catalyst to form an intermediate addition product and that this addition product may be hydrolyzed to form an unsaturated aldehyde having more carbon atoms than the starting saturated aldehyde. If the starting aldehyde has a straight chain structure and if the starting ether is a vinyl ether, the higher alkenal obtained as a product will also be normal and will contain two more carbon atoms at the end of the chain. The intermediate addition product of the saturated aldehyde and the alkenyl alkyl ether is composed of two molecules of the aldehyde and one of the ether in chemical combination. Upon hydrolysis of the intermediate product, in addition to the higher unsaturated aldehyde, there are obtained one molecule of the starting saturated aldehyde and one molecule of an alkanol corresponding to the alkyl group of the alkenyl alkyl ether. The saturated aldehyde may be recycled in the process and the recovered alkanol may be converted to a vinyl or alkenyl ether for use in the process by known methods. Thus the process provides a very efficient utilization of raw materials.

The intermediate addition product is a substituted 1,3-dioxane and its formation from a vinyl ether may be represented by the following reaction, where $R^1$ and $R^2$ are alkyl groups.

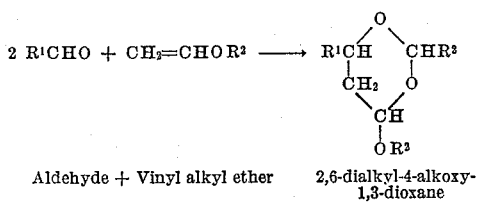

Aldehyde + Vinyl alkyl ether    2,6-dialkyl-4-alkoxy-1,3-dioxane

The hydrolysis of this intermediate product may be represented as follows:

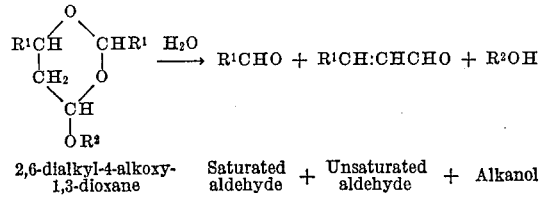

2,6-dialkyl-4-alkoxy-1,3-dioxane   Saturated aldehyde + Unsaturated aldehyde + Alkanol It will be noted that the intermediate product is a complex acetal having one O—C—O linkage entirely inside the ring and one O—C—O linkage partly inside and partly outside the ring. Thus, the decomposition of this acetal into two aldehydes and an alcohol is referred to as an hydrolysis reaction, although there is no over-all consumption of water.

The course of the reaction with a 1-alkenyl alkyl ether other than a vinyl ether is the same, and it may be represented in the above equation by replacing one of the beta-hydrogen atoms of the vinyl ether with an alkyl group, the substituent alkyl group appearing in the 2-position of the unsaturated aldehyde product. Thus, it will be noted that the unsaturated aldehydes obtained from normal saturated aldehydes are normal only when a vinyl ether is employed, and the reaction with a vinyl ether constitutes the preferred embodiment of the invention.

The reaction of the vinyl ether with the saturated aldehyde is preferably carried out under anhydrous conditions in the presence of a small amount of a Friedel-Crafts catalyst, such as boron trifluoride, aluminum chloride, zinc chloride, or phosphotungstic acid. It is desirable to use an excess of the aldehyde in the reaction, for example, from two to four moles of the aldehyde to one of the ether, and to carry the reaction to completion with respect to the ether. The use of an excess of the aldehyde in forming the addition product is preferred, as by-products are formed at lower ratio of aldehydes to ether. The presence of water is undesirable as it causes hydrolysis of the vinyl ether. The reaction is exothermic and may be carried out at any temperature where removal of the heat of reaction can be accomplished. Temperatures of 30 to 80° C. usually constitute the desired operating range. Upon completion of the reaction, the catalyst may be neutralized prior to hydrolysis of the intermediate product, but this step is not essential. Also, it is unnecessary to purify the crude addition product prior to hydrolysis as the excess saturated aldehyde may be recovered when working up the crude hydrolysis product together with the additional amounts of saturated aldehyde formed in the process.

Hydrolysis of the intermediate 1,3-dioxane addition product can be accomplished by introducing the addition product into an aqueous solution of either an organic or inorganic acid, such as sulfuric or acetic acid, which serves as a hydrolysis catalyst. Upon refluxing the charge, the hydrolysis products, i. e. the unsaturated aldehyde, the saturated aldehyde and the alkanol are evaporated as formed along with water. Upon condensation of the distillate, a two layer condensate is obtained from which the water layer may be returned to the cracking kettle, and the organic layer is distilled to separate the aldehydes and alcohol.

The reaction of the alkenyl ether with a saturated aldehyde to form a substituted 1,3-dioxane is to be distinguished from the reaction of vinyl ethers with unsaturated aldehydes in the absence of catalysts to form derivatives of dihydropyran. For example, equimolar quantities of crotonaldehyde and vinyl methyl ether when heated at 225° C. (U. S. Patent No. 2,514,168) react to form 2-methoxy-4-methyl-3,4-dihydro-1,2-pyran having the structure

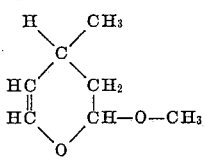

by a mechanism similar to a Diels-Alder reaction. On the other hand, two molecules of butyraldehyde react with one molecule of vinyl methyl ether according to the reaction of this invention to form 2,6-dipropyl-4-methoxy-1,3-dioxane having the structure:

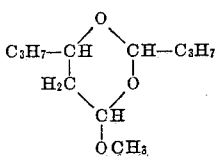

Thus the reaction of the invention is generic to the addition of saturated aldehydes, such as acetaldehyde, propionaldehyde, butyraldehyde, hexaldehyde, 2-ethylhexaldehyde and the like, with vinyl alkyl ethers, such as vinyl ethers of methanol, ethanol, propanol, butanol and the like, or with 1-alkenyl alkyl ethers, such as 1-propenyl alkyl ether, 1-butenyl alkyl ether and the like. Since the alkyl group of the starting ether is recovered as the corresponding alkanol after hydrolysis of the intermediate addition product, the recovery of the hydrolysis products is simplified if the alkyl group contains from one to six carbon atoms, since the lower boiling alcohols are easier to separate from the remainder of the hydrolysis products.

The unsaturated aldehydes formed in the present process are valuable intermediates as they may be oxidized to organic acids or hydrogenated to form saturated alcohols.

The following examples will serve to illustrate the synthesis of unsaturated aldehydes from 1-alkenyl alkyl ethers and saturated aldehydes.

*Example 1*

A mixture of 2485 grams (34.5 mols) of butyraldehyde and 828 grams (11.5 mols) of vinyl ethyl ether was added to a stirred solution of boron trifluoride etherate in 70 grams of ethyl ether (0.05 per cent boron trifluoride based on the total charge). Reaction occurred rapidly and the temperature was maintained between 20° and 58° C. (average temperature 52° C.). Addition of the aldehyde-vinyl ether mixture was complete in 43 minutes, after which the product was stirred another hour before the addition of 161 grams of 10 per cent aqueous sodium acetate solution to neutralize the catalyst. The mixture was agitated for three hours and then the aqueous layer was separated from the product.

A portion of the product, 1332 grams, was hydrolyzed with 5 per cent aqueous sulfuric acid to give 2-hexenal in about 65 per cent yield based on the vinyl ether employed. 2-hexenal boils at about 51° C. at 20 mm.

*Example 2*

Butyraldehyde and vinyl methyl ether were reacted in a mol ratio of 3 to 1 at a temperature of 40° to 45° C. using boron trifluoride etherate as the catalyst (0.05 per cent boron trifluoride based on the total charge). The crude addition product was added dropwise to an agitated, boiling, 5 per cent aqueous sulfuric acid solution and a mixture of methanol, butyraldehyde and 2-hexenal was distilled out as fast as it was formed. Redistillation of this mixture gave 2-hexenal in a yield of about 72 per cent, based on the vinyl methyl ether employed.

*Example 3*

A mixture of 15 mols (1082 grams) of butyraldehyde and 5 mols (431 grams) of 1-butenyl methyl ether was added to a stirred solution of 30 grams of ethyl ether and 2.5 grams of a 30 per cent solution of boron trifluoride in ethyl ether. The reaction temperature was maintained at 40° to 45° C. and the addition of the butyraldehyde-unsaturated ether mixture required 28 minutes. The mixture was stirred an additional 60 minutes while the temperature dropped from 45° to 16° C. The boron trifluoride was neutralized by agitating the reaction product for 3.25 hours with 10 grams of anhydrous sodium carbonate. The mixture was filtered to remove the salts.

A portion of the filtered reaction product (712 grams) was distilled in the presence of 1345 grams of 10 per cent aqueous hydrochloric acid solution. During the course of about 13 hours 747 grams of a distillate was collected boiling between 65° and 99° C. Water (200 grams) was added to the still kettle during the distillation to replace that lost in the distillate. The distillate consisted essentially of methanol, butyraldehyde, water and the desired 2-ethyl-2-hexenal (2-ethyl-3-propyl-acrolein). This crude hydrolysate was distilled to recover about 195 grams of 2-ethyl-2-hexenal (B. P. 58° C., 10 mm. Hg). This represents a yield of about 78 per cent, based on the 1-butenyl methyl ether.

*Example 4*

A mixture of 2640 g. (26.4 moles) of n-hexaldehyde and 510 g. (8.3 moles) of vinyl methyl ether was added slowly to a stirred solution of 70 g. of ethyl ether and 5 g. of a 33 per cent solution of boron trifluoride in ethyl ether. A reaction temperature of 40° to 50° C. was maintained and the addition was complete in one hour. The reaction mixture was stirred an additional two hours and then the catalyst was neutralized by adding 160 g. of 10 per cent aqueous sodium acetate solution. This mixture was agitated for an hour and then the lower aqueous layer was separated from the neutralized product.

A portion (3130 g.) of the neutralized reaction product containing 2,6-dipentyl-4-methoxy-1,3-dioxane was added to 1000 g. of boiling 80 per cent aqueous acetic acid over a period of 20 hours and the entire organic material (consisting mainly of methanol, n-hexaldehyde, and 2-octenal) which steam-distilled was removed continuously as 2635 g. of distillate. The still kettle residue was diluted with 2 liters of water and the organic layer which separated (780 g.) was combined with the organic distillate and redistilled under reduced pressure. Practically pure (486 g.) 2-octenal (B. P. 71° C. at 10 mm. Hg) was obtained in 45 per cent yield based on vinyl methyl ether and 73 per cent efficiency based on hexaldehyde.

*Example 5*

2-pentenal (boiling point, 50° C. at 10 mm. Hg) was made in about 43 per cent yield by hydrolysis of the reaction product of propionaldehyde and vinyl ethyl ether, 2,6-dimethyl-4-methoxy-1,3-dioxane. The reactions were carried out as described in the foregoing examples.

*Example 6*

Butyraldehyde, 1947 grams (27.1 mols) and 664 grams of 97.7 per cent vinyl ethyl ether (9.0 mols) were mixed and added to a stirred mixture of 26 grams of zinc chloride in 80 grams of ethyl ether (1.0 per cent zinc chloride based on the total charge weight). The addition of the reactants required 38 minutes at an average temperature of 49° C. The product was stirred 30 minutes before adding a solution of 62 grams of sodium acetate in 248 cc. of water to neutralize the zinc chloride catalyst. The mixture was agitated approximately 4½ hours before separating the product from the aqueous layer.

A portion of the neutralized product, 1257 grams, was hydrolyzed by distillation with 50 per cent aqueous acetic acid to give a mixture consisting essentially of ethanol, butyraldehyde, 2-hexenal and water. This mixture was redistilled, first at atmospheric pressure, then under reduced pressure to obtain 2-hexenal in about 36 per cent yield.

*Example 7*

A mixture of 1947 grams of butyraldehyde (27.1 mols) and 676 grams of 97.7 per cent vinyl ethyl ether (9.1 mols) was added to a stirred solution of phosphotungstic acid in 80 grams of ethyl ether (0.10 per cent phosphotungstic acid based on the total charge). The addition of the mixture required 36 minutes at an average reaction temperature of 50° C. The reaction product was stirred one hour before neutralizing the phosphotungstic acid with 53 grams of 10 per cent aqueous sodium acetate solution. The mixture was agitated 5 hours and then the aqueous layer was separated from the neutralized product.

A portion of the neutralized product, 1054 grams, was hydrolyzed by distillation with 50 per cent aqueous acetic acid to give a mixture of water, ethanol, butyraldehyde and 2-hexenal. Redistillation of this crude distillate gave 2-hexenal in about 36 per cent yield, based on vinyl ethyl ether.

What is claimed is:

1. Process for making unsaturated aldehydes which comprises reacting a saturated aliphatic aldehyde in the presence of a Friedel-Crafts type catalyst with a 1-alkenyl alkyl ether to form an intermediate addition product, hydrolyzing the intermediate addition product, and recovering an unsaturated aldehyde, having a greater number of carbon atoms than the saturated aldehyde, from the hydrolysis products.

2. Process for making unsaturated aldehydes which comprises reacting a saturated aliphatic aldehyde in the presence of a Friedel-Crafts type catalyst with a vinyl alkyl ether to form an intermediate addition product, hydrolyzing the intermediate addition product, and recovering an unsaturated aldehyde, having two more carbon atoms than the saturated aldehyde, from the hydrolysis products.

3. Process as claimed in claim 2 in which the catalyst is boron trifluoride.

4. Process as claimed in claim 2 in which the alkyl group of the vinyl ether contains from one to six carbon atoms.

5. Process as claimed in claim 2 in which the molar ratio of the saturated aliphatic aldehyde to the vinyl alkyl ether is at least two to one.

6. Process for making 2-hexenal which comprises reacting butyraldehyde with a vinyl alkyl ether in the presence of boron trifluoride to form an intermediate addition product, hydrolyzing the intermediate addition product, and recovering 2-hexenal from the hydrolysis product.

7. Process for making 2-octenal which comprises reacting hexaldehyde with a vinyl alkyl ether in the presence of boron trifluoride to form an intermediate addition product, hydrolyzing the intermediate addition product, and recovering 2-octenal from the hydrolysis products.

8. Process for making 2-pentenal which comprises reacting propionaldehyde with a vinyl alkyl ether in the presence of boron trifluoride to form an intermediate addition product, hydrolyzing the intermediate addition product and recovering 2-pentenal from the hydrolysis products.

RAYMOND I. HOAGLIN.
DONALD H. HIRSH.

REFERENCES CITED

The following references are of record in the file of this patent:

UNITED STATES PATENTS

| Number | Name | Date |
|---|---|---|
| 2,312,743 | Arundale | Mar. 2, 1943 |
| 2,543,312 | Copenhaver | Feb. 27, 1951 |